T. G. CLINTON & G. H. & E. H. KNIGHT.
Churn.
No. 6,764.  Patented Oct. 2, 1849.
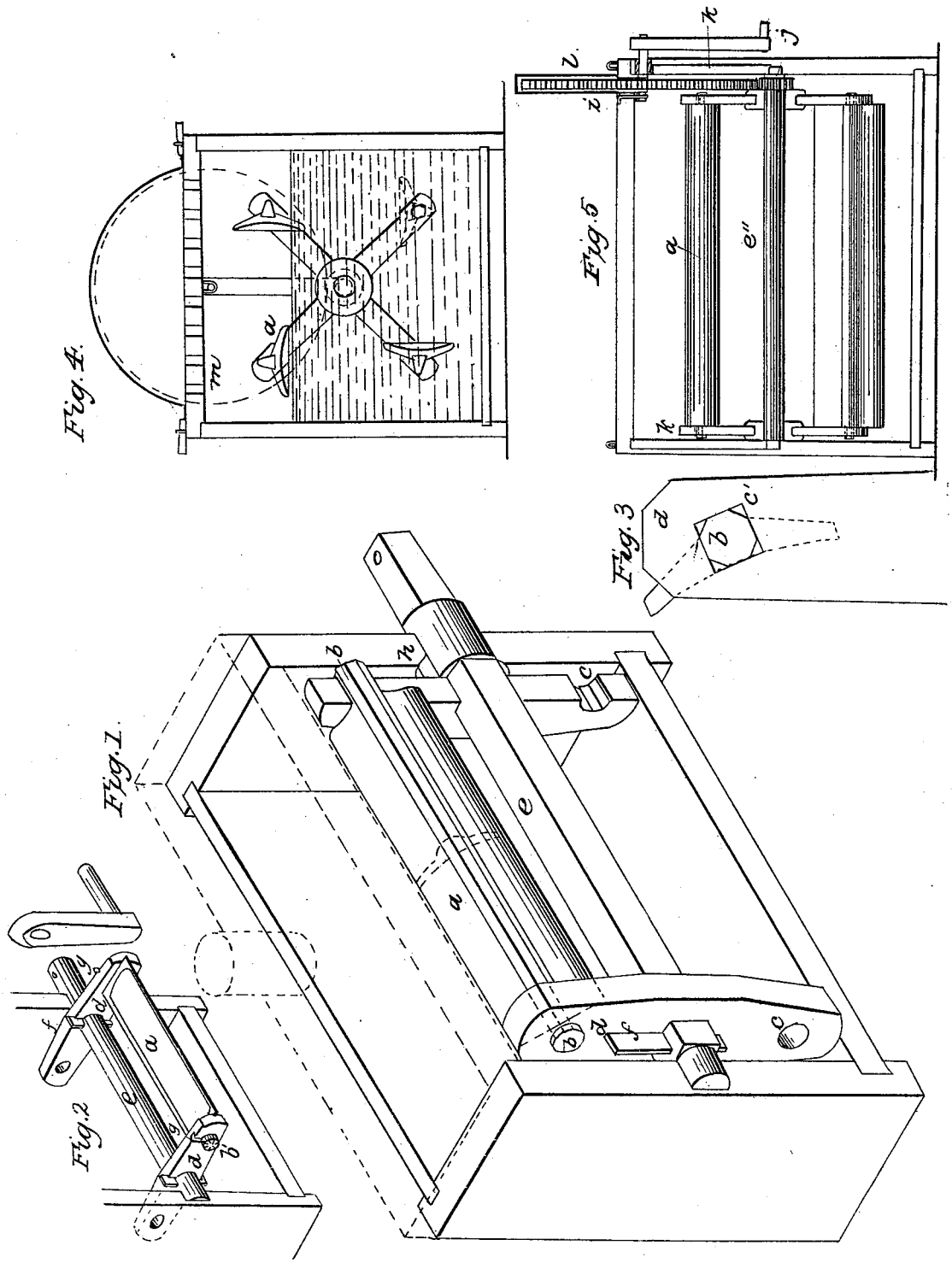

UNITED STATES PATENT OFFICE.

THO. G. CLINTON, GEO. H. KNIGHT, AND EDW. H. KNIGHT, OF CINCINNATI, OHIO.

ADJUSTABLE CHURN-DASHER.

Specification of Letters Patent No. 6,764, dated October 2, 1849.

*To all whom it may concern:*

Be it known that we, THOMAS G. CLINTON, GEORGE H. KNIGHT, and EDWARD H. KNIGHT, of Cincinnati, Ohio, have invented new and useful Improvements in Concave Beater-Churns, the Beaters Rotating Vertically; and we do hereby declare the following to be a full, clear, and exact description of the same, reference being had to the annexed drawings, making part of this specification, in which—

Figure 1 is a perspective vertical section of one form of the churn. Fig. 2 is a perspective vertical section of another form. Fig. 3 is an end view of one mode of attachment of adjustable bucket. Fig. 4 is a transverse section of a churn on this plan. Fig. 5 is a longitudinal section of ditto.

In former attempts to introduce air in sufficient quantities and at little cost down through the milk for the more rapid production of butter, results have not been as satisfactory as was desirable. Either the mechanism has been too costly or the contrivance has not been adapted to put a suitable quantity of milk under the churning process in proportion to the capacity of the churn. It is obvious that beaters rotating vertically and having their concavity brought down upon the surface of the milk (if the surface of the milk is in the plane of the face of the beaters) will carry down into the milk the air filling the concavity, and distribute the air throughout the liquid. It is also obvious that this mode of applying the air is the cheapest and most certain— yet if the beaters are permanently attached to arms, extending from the axis of motion, it is likewise obvious that the only plane in which they and the milk can meet so that the beater can carry the air down through the milk is at some one level, such as that of the axis of motion. This defect confines the churning operation by this mode to a definite and unchangeable quantity of milk. The liquid can neither rise above nor fall below the axis of motion (if that level be selected,) and receive air from the beater. Because if the milk is higher or lower than that level the beater only passes through the air. It cannot carry any air down through the milk and for these reasons. Being permanently fixed to arms extending from the axis of motion, the beater, (if the milk rises above that level) dips into the liquid by its inner edge; and, if the milk falls below the same level, the beater slides into the liquid by its outer edge—thus in both cases leaving the air where it found it; viz—at the surface of the milk.

The nature of our invention consists in so constructing and arranging concave beaters rotating vertically that the level of the milk may rise above or fall below the axis of motion to a very great degree and still have air distributed therethrough by the beaters in quantities equal to their capacity for holding the same.

The face of the beater and the surface of the milk can by our improvement be brought into the same plane either at the level of the full capacity of the churn for retaining the milk during the process or down so low that the quantity of milk would not more than thoroughly cover the bottom of the churn. This we effect by constructing the arms extending from the axis of motion and the concave beaters where they both are connected in such manner that the beaters can lie between the arms at any desired angle to a plane passing through the center of their journals, and the axis of motion. In the drawings hereunto annexed we have shown various modes of effecting this adjustment. It is also contemplated by us to construct the dasher without a shaft running the length of the churn from head to head, so that the butter can collect within the sweep of the beaters through the milk. We also arrange the dasher in such wise that it can be taken out of the churn, and to pieces after each churning so that it can be readily scalded. It will also be perceived that we bring no metal in contact with the milk. This mode of constructing churns on our principle we prefer. Yet we can readily use irons (as we have done) and that at a cost of 18 cents.

In making the beaters adjustable to the quantity of milk to be churned, we can use a square motise in the arm with an octagonal primal to the beater as in Fig. 3 or the construction represented in Fig. 1—or adopt cylindrical journals and pins to fasten the same in the holes in the arms and similar arrangements in regard to the shaft, as in Fig. 2. There are various other modes of attaining the result, many of which we have devised and rejected on account of the cost of getting them up.

In Figs. 1, 2, 3 (*a*) is the adjustable concave beater, (*b*) is the journal of the same; (*c*) is the mortise or hole in the arms for the reception of the journal of the beater, (d) is the arm; (e) is a shaft rectangular as in Fig. 1, or cylindrical as in Fig. 2; (f) is the wedge for fastening the apparatus for operation as seen in Fig. 1. When the shaft being rectangular, one wedge suffices.

In Fig. 2, two wedges are requisite for strength and certainty of action as the wedges in the cylindrical shaft, not only tighten the dasher and shaft, but carry around the arms of the dasher when the journal of the beaters are cylindrical as in Fig. 2, wedges or pins (g) may be used to fix them to any desired angle. It is however obvious that if left without any fastening a pin projecting from the arms so as to take the inner edge of the beater as it struck the milk, would operate, or that a hook or staple fixed to the inner (or even outer) edge of the beater could be made to fix it at any desired angle by simply forcing the point of the hook into the arm, or a wooden slide hinged to the beater or running in a groove in the arm or otherwise arranged would also operate.

The churn consists simply of a quadrangular box made in the usual way, with a cylindrical bearing of the inside of one end for the shaft and a hole through the other end for the insertion of the shaft. An annular disk of leather fills a conical cavity around the inside of the opening where the shaft is inserted and the wedge (f) forcing the arm of the beaters against this disk (of leather, gutta percha, or other suitable material) a water tight joint is made. The hydrostatic pressure also tends to keep the joint tight. Where irons are used holes can be made through both ends of the churn, a screw and nut being used at one end and a square socket in the arms of the beaters for a crank shaft, having a collar and bearing against a disk of leather, as it passes through the other end.

In Fig. 4, (a) is the bucket, (m) aperture in lid.

In Fig. 5, (a) is bucket; (e″), octagonal shaft; (j), pinion or small disk or pulley; (i) driving wheel or large disk or pulley; (l) tin sheath to driving wheels; (k) grooves to admit the pivots.

Having thus fully described the nature, construction and operation of our churn what we claim therein as new and desire to secure by Letters Patent, is—

Making adjustable to any desired angle the concave beater, rotating vertically in the process of churning; and thus extending the pneumatic action incident to its concavity to any quantity of milk, the surface of which and the face of the beater can be made to meet in the same plane as described.

THOS. G. CLINTON.
GEO. H. KNIGHT.
EDWARD H. KNIGHT.

Witnesses:
JOSEPH CASSIN,
C. BOLMEN.